United States Patent
Vudali et al.

(10) Patent No.: US 9,838,839 B2
(45) Date of Patent: Dec. 5, 2017

(54) REPACKAGING MEDIA CONTENT DATA WITH ANONYMOUS IDENTIFIERS

(71) Applicant: Apple Inc., Cupertino, CA (US)

(72) Inventors: Madhusudhan Vudali, Santa Clara, CA (US); Prasad Rallabandi, Saratoga, CA (US); Jason Novak, Cupertino, CA (US); Sagar Joshi, San Jose, CA (US); Todd Michael Teresi, Los Gatos, CA (US); Erik C. Neuenschwander, San Mateo, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/171,361

(22) Filed: Jun. 2, 2016

(65) Prior Publication Data

US 2016/0360355 A1 Dec. 8, 2016

Related U.S. Application Data

(60) Provisional application No. 62/171,919, filed on Jun. 5, 2015.

(51) Int. Cl.
*H04W 4/02* (2009.01)
*H04W 4/20* (2009.01)

(52) U.S. Cl.
CPC .............. *H04W 4/02* (2013.01); *H04W 4/20* (2013.01)

(58) Field of Classification Search
CPC ................................. H04W 4/02; H04W 4/20
See application file for complete search history.

(56) References Cited

U.S. PATENT DOCUMENTS

| | | | |
|---|---|---|---|
| 7,472,423 B2 | 12/2008 | DeCenzo et al. | |
| 9,009,258 B2* | 4/2015 | Ramachandran | H04N 21/2396 709/217 |
| 2011/0010425 A1 | 1/2011 | Bernatz | |
| 2014/0188633 A1* | 7/2014 | Baskin | G06Q 30/0275 705/14.71 |
| 2014/0215635 A1 | 7/2014 | Neuenschwander et al. | |

FOREIGN PATENT DOCUMENTS

| | | |
|---|---|---|
| WO | 2008/086190 | 7/2008 |
| WO | 2013/134393 | 9/2013 |

\* cited by examiner

*Primary Examiner* — Brandon Miller
(74) *Attorney, Agent, or Firm* — Polsinelli LLP

(57) ABSTRACT

Systems, methods, and computer-readable storage media for maintaining user anonymity in content statistics. A system can first receive a media content request from a client device. The media content request can include a user account identifier and a content identifier. The content identifier can be different and separate from the user account identifier and a device identifier associated with the client device, and the content identifier can identify content presented at the client device. Next, the system can store the user account identifier and the content identifier in separate locations without attributing the content identifier to the user account identifier. In response to the media content request, the system can transmit a media content item to the client device based on the user account identifier. The system can also report the content presented at the client device with the content identifier and without the user account identifier.

18 Claims, 6 Drawing Sheets

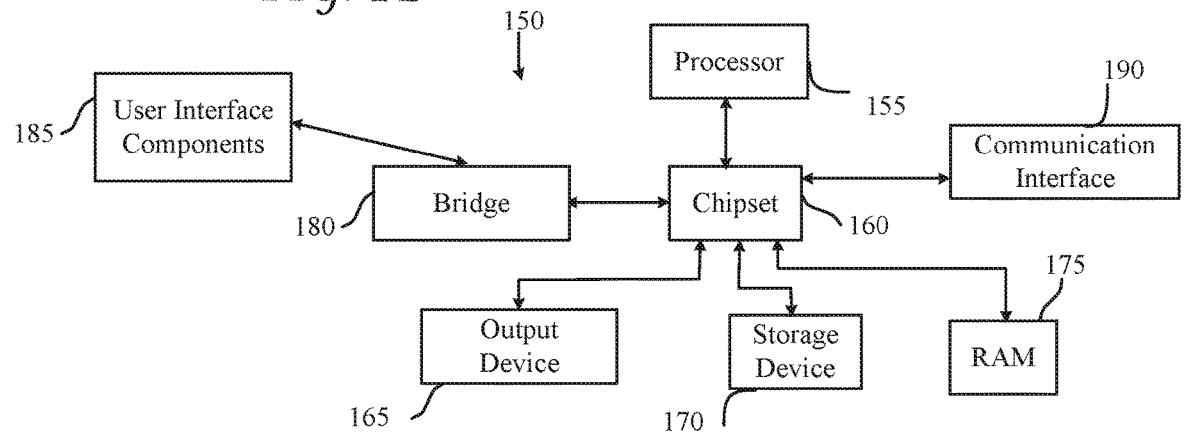
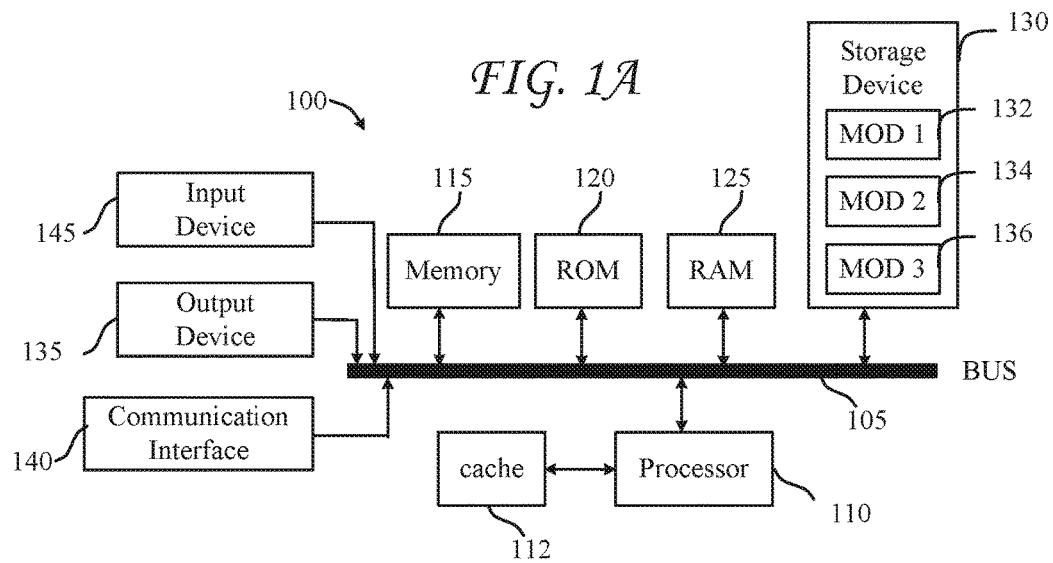

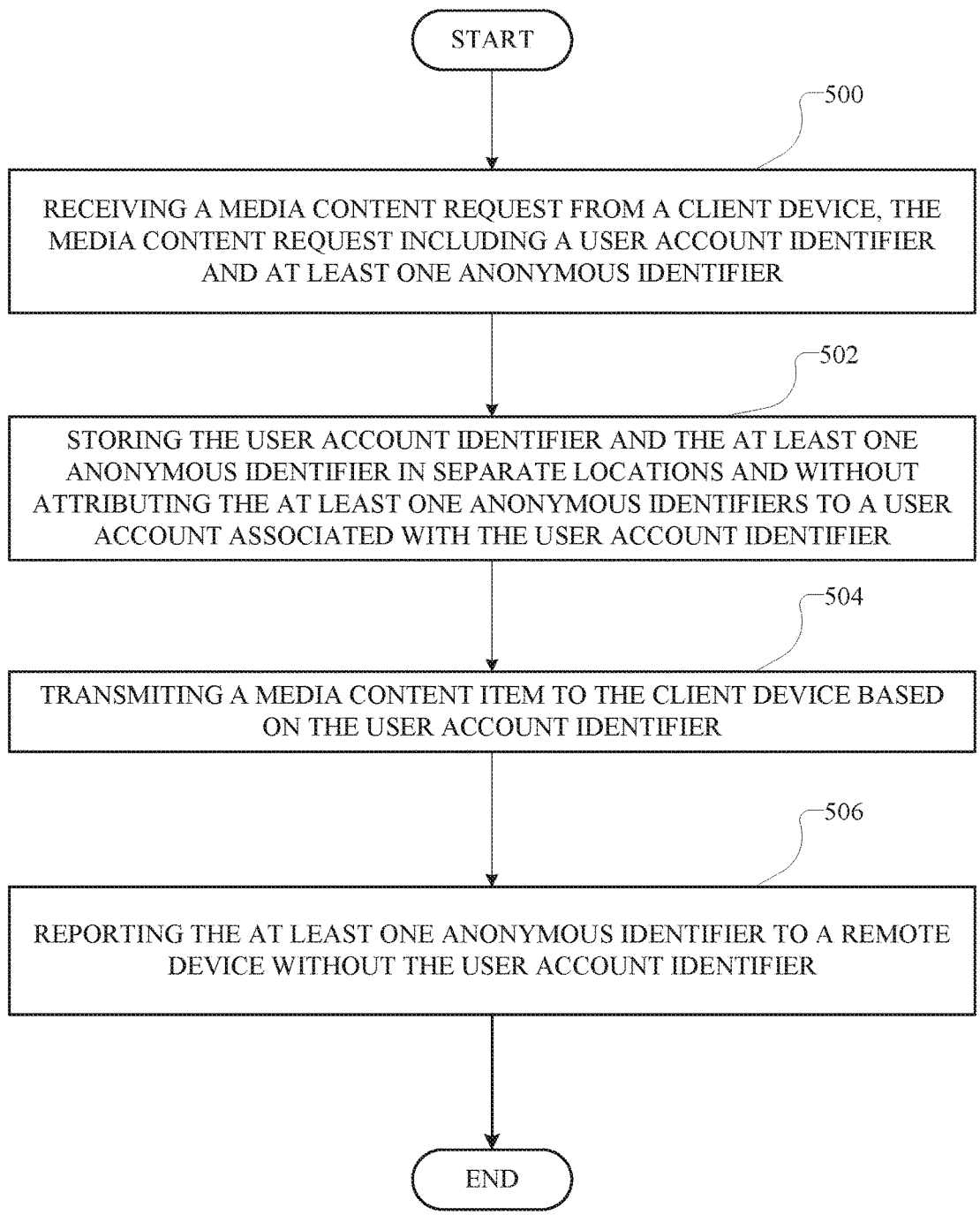

REPACKAGING MEDIA CONTENT DATA WITH ANONYMOUS IDENTIFIERS

CROSS-REFERENCE TO RELATED APPLICATIONS

This application claims the benefit of priority of U.S. Provisional Patent Application Ser. No. 62/171,919, filed on Jun. 5, 2015, which is incorporated herein by reference in its entirety.

TECHNICAL FIELD

The present technology relates generally to user privacy in a network-based ecosystem and more specifically to devices creating a firewall between a client device and a media content provider across which personal user data does not cross.

BACKGROUND

Digital content and media playback capabilities have been integrated in numerous common, everyday devices such as mobile phones and tablet computers. Not surprisingly, the widespread availability of such computing devices has prompted an enormous demand for digital and media content. The Internet has further fueled this demand, serving as a popular and convenient resource for such content and greatly expanding the amount of digital and media content available to users. While providing content to a user, collection of personal information by content providers should meet or exceed industry or governmental requirements for maintaining personal information data and keeping it private and secure. Thoughtful ways of maintaining privacy of personal and private information can help address concerns of how such information is used.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein allow the provision of targeted media content to a user while maintaining anonymity of the user and the content consumed by the user. For example, the content consumption of the user, including application content, invitational content, device content, and/or user content, can be divided or split and stored in different locations, such as logs. Each of the different locations can also store an anonymous identifier to represent the stored data. Any user or device identifiers which can be used to identify the user or the user's device can then be maintained separate from the anonymous identifiers and the associated data such that the anonymous identifiers and the associated data may not be correlated to the user or the user's device. Thus, these approaches can be used to provide invitational content to a user without specifically identifying the user or tracking information which can be used to correlate a specific user to the content consumed by the user. The anonymized information can then be used, for example, to optimize content campaigns while maintaining user privacy.

Disclosed are systems, methods, and non-transitory computer-readable storage media for maintaining user anonymity in content statistics. A system, such as a server, can first receive a media content request from a client device, such as a smartphone or a tablet computer. The media content request can include a user account identifier, a first anonymous identifier, and/or a second anonymous identifier. The first and second anonymous identifiers can be different and separate from the user account identifier and/or a device identifier associated with the client device. Moreover, the first anonymous identifier can be a content identifier which can identify content presented at the client device, and the second anonymous identifier can be an invitational content identifier which can identify invitational content delivered to, and/or presented by, the client device.

The system can store the user account identifier and the first and second anonymous identifiers in separate locations and without attributing the first and second anonymous identifiers to a user account associated with the user account identifier. For example, the system can store the first and second anonymous identifiers separately from the user account identifier and without any correlations to the user account identifier. This way, the first and second anonymous identifiers can be stored separately from the user account identifier and without any information that explicitly identifies or associates the first and second anonymous identifiers with the user account identifier. Thus, a system or user that reads the first and second anonymous identifiers may not be able to correlate the first and second anonymous identifiers to the user account and user associated with the user account identifier.

In response to the media content request, the system can transmit a media content item to the client device based on the user account identifier. The media content item can include any media content such as audio, video, text, and so forth.

The system can report the first and/or second anonymous identifiers to a remote device, such as a server, without a user account identifier. In some cases, the system can report the first and/or second anonymous identifiers to the same or different entities, such as one or more media, application, or messaging content providers. Moreover, the first and/or second anonymous identifiers can be reported along with associated content. For example, the first anonymous identifier can be reported along with an indication of content presented or consumed at the client device, such as application content or a web page. Similarly, the second anonymous identifier can be reported along with an indication of invitational content transmitted to, or presented at, the client device.

One or more remote systems, such as servers, can receive the first and/or second anonymous identifiers along with data associated with the first and/or second anonymous identifiers in order to obtain data and statistics about an unknown user represented by the first and/or second anonymous identifiers. The remote systems can then use this information to target the unknown user with content, modify content campaigns, evaluate content or campaign performance, modify the amount or delivery of content, determine costs and/or revenue details, adjust or analyze budgeting details, and/or collect or report other metrics—all without identifying the specific user, revealing the user's actual identity, or maintaining personal or private details about the user. The remote systems can use this information to identify specific content interactions and activities for an unknown user, identify specific characteristics about the user (e.g., demographics, location, etc.), and correlate the unknown user, the specific characteristics, and the specific content interactions and activities when performing analytics and making adjustments to campaigns, content, etc.

In this way, the remote systems can also collect content interactions and activities as well as user characteristics for multiple, unknown users and aggregate the data for analysis. The aggregated data can then provide meaningful information about users and interactions without identifying specific users. For example, the aggregated data may indicate that n number of unknown male users aged 20 to 25 have viewed article X from application Y and received invitational content item Z from application Y. This can provide useful information about article X, application Y, invitational content item Z, and/or interactions associated with male users between the ages of 20 and 25.

The present disclosure recognizes that the use of personal information data can be used to the benefit of users. For example, personal information data can be used to better understand user behavior, facilitate and measure the effectiveness of applications and delivered digital content. Accordingly, use of such personal information data enables calculated control of the delivered digital content. For example, the system can reduce the number of times a user receives a given ad or other content and can thereby select and deliver content that is more meaningful to users. Such changes in system behavior improve the user experience. Further, other uses for personal information data that benefit the user are also contemplated by the present disclosure.

The present disclosure further contemplates that the entities responsible for the collection, analysis, disclosure, transfer, storage, or other use of such personal information data should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after the informed consent of the users. Additionally, such entities would take any needed steps for safeguarding and securing access to such personal information data and ensuring that others with access to the personal information data adhere to their privacy and security policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of invitational content delivery services, the present technology can be configured to allow users to select to "opt in" or "opt out" of participation in the collection of personal information data during registration for services. In another example, users can select not to provide location information for invitational content delivery services. In yet another example, users can configure their devices or user terminals to prevent storage or use of cookies and other mechanisms from which personal information data can be discerned. The present disclosure also contemplates that other methods or technologies may exist for blocking access to their personal information data.

Moreover, the present disclosure includes mechanisms which can be implemented to protect the privacy of users and anonymize data collected. For example, data collected about a user can be maintained separately from any information, such as a user identifier or account identifier, that may identify the specific user. Any information collected or reported about the user which may be personal or may breach the user's privacy may be generalized or anonymized. For example, such data can be stored or reported without any information that may specifically identify the user, and the user can otherwise be anonymously identified using an anonymous or random identifier that may not reveal any specific details about the user.

Therefore, although the present disclosure may cover use of personal information data to implement one or more various disclosed embodiments, the present disclosure also contemplates that the various embodiments can also be implemented without the need for accessing and/or reporting such personal information data and/or with protections to maintain the user's privacy. The various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 1A and 1B illustrate example system embodiments;

FIG. 5 illustrates example method embodiment.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 2:
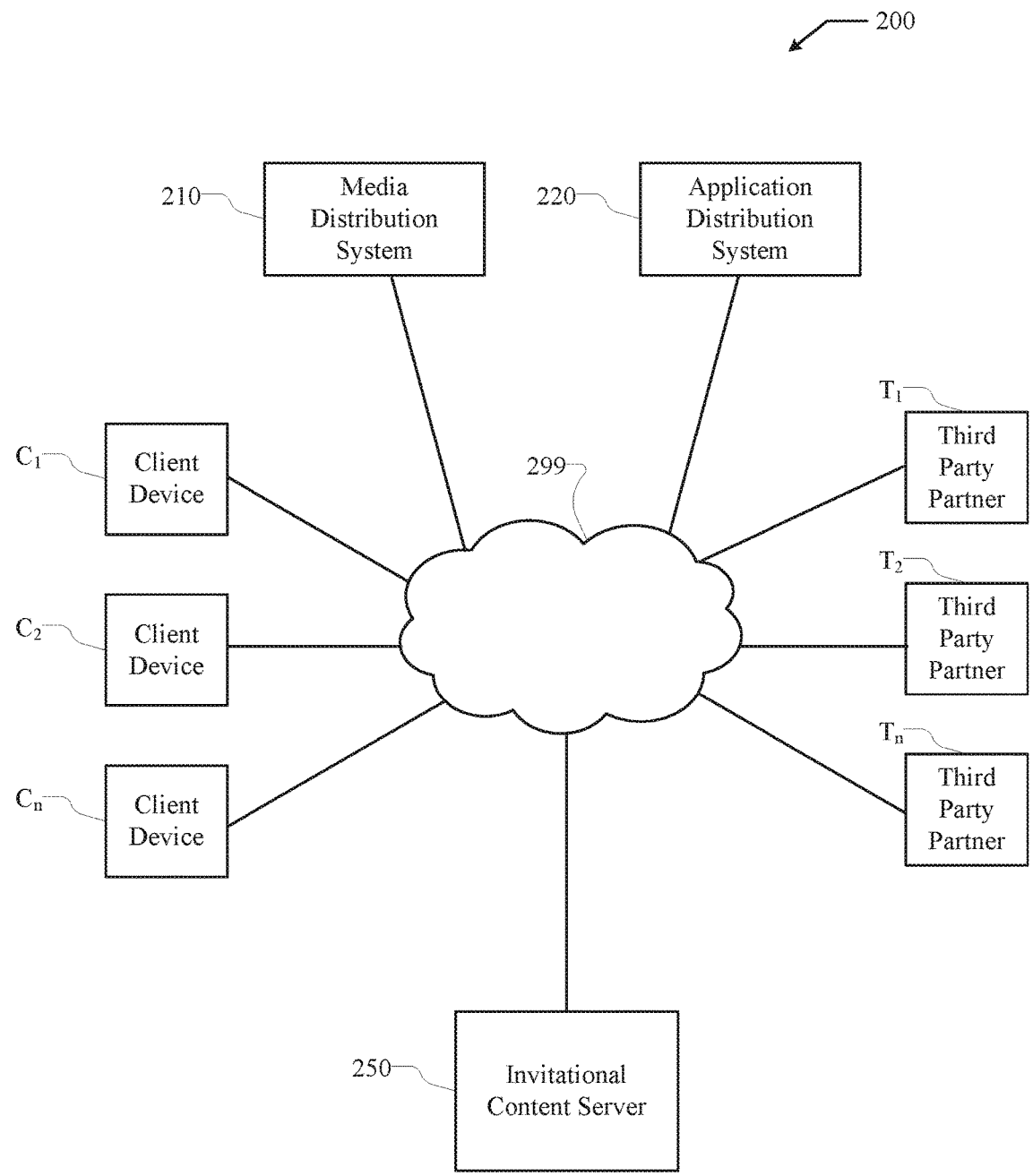
FIG. 2 illustrates an example network infrastructure 200 according to some embodiments.
Figure 3:
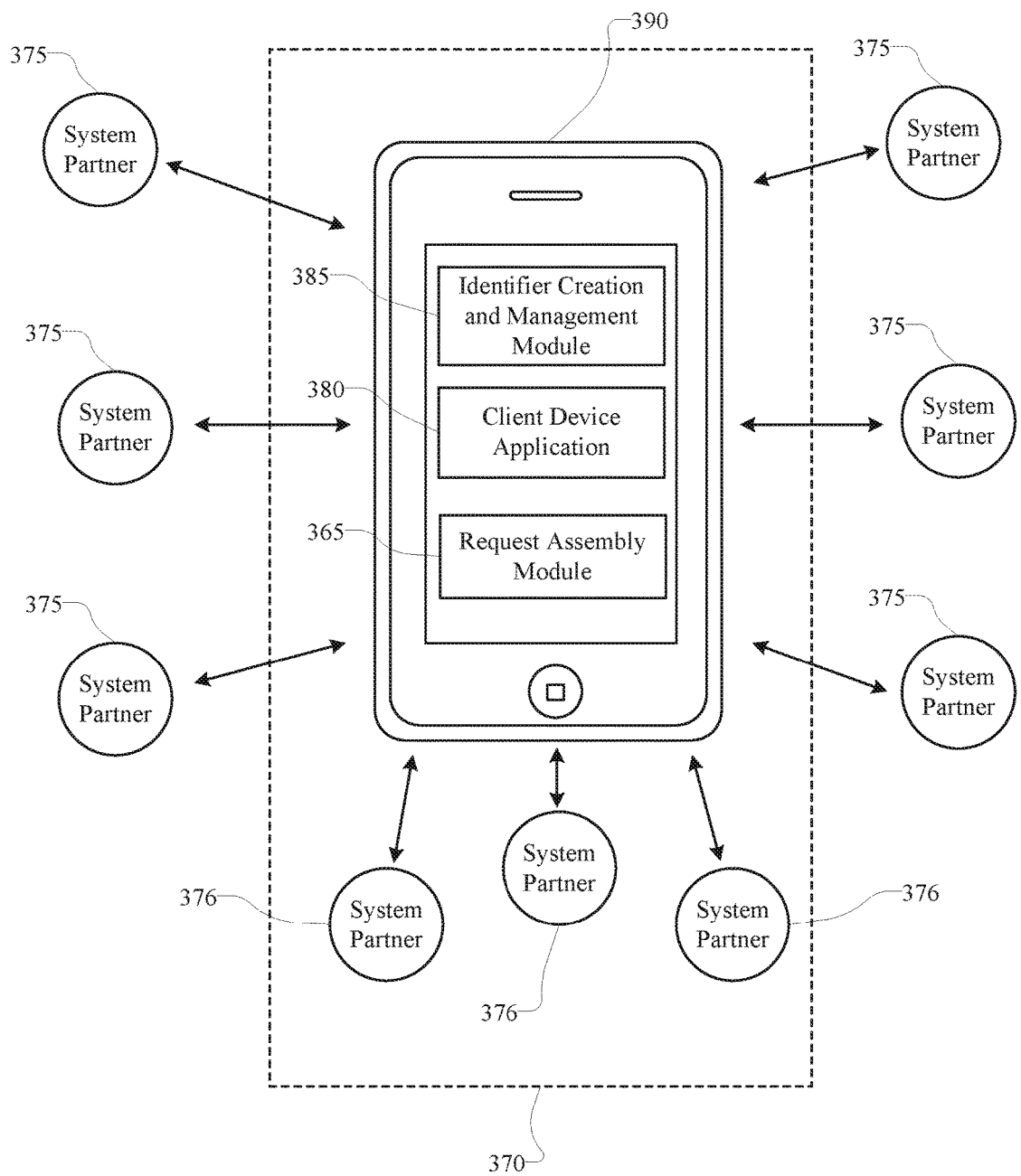
FIG. 3 illustrates an example system for device-based information management in an ecosystem having system partners and according to some example embodiments.

Disclosed are systems, methods, and non-transitory computer-readable storage media for maintaining user anonymity in content statistics. A description of example systems and configurations for content delivery, consumption, and statistics, as shown in FIGS. 1-3, is first disclosed herein. A detailed description of maintaining user anonymity in content statistics, including examples and variations, will then follow. These variations shall be described herein as the various embodiments are set forth.

Although the various embodiments will be described with respect to the general concept of withholding actual identifier values from remote parties and devices and separating content information and statistics from actual identifiers or personal and/or identifying information, the present disclosure contemplates that such withholding and separation of content information is not necessarily absolute. For example, an actual identifier value of a client device may be withheld for certain parties or devices, but may still be shared with other parties or devices. Indeed, in some cases, personal information can be shared or used without restriction or withholding or with limited restriction or withholding. Moreover, the use of identifier values and/or personal information in accordance with the various embodiments of the present technology can be specified a priori or by the user at the client device. The disclosure now turns to FIGS. 1A and 1B.

Various embodiments of the present technology can be carried out using one or more computing devices. FIGS. 1A and 1B illustrate example system embodiments. The more appropriate embodiment will be apparent to those of ordinary skill in the art when practicing the present technology. Persons of ordinary skill in the art will also readily appreciate that other system embodiments are possible.

FIG. 1A illustrates a conventional system bus computing system architecture 100 wherein the components of the system are in electrical communication with each other using a bus 105. Exemplary system 100 includes a processing unit (CPU or processor) 110 and a system bus 105 that couples various system components including the system memory 115, such as read only memory (ROM) 120 and random access memory (RAM) 125, to the processor 110. The system 100 can include a cache of high-speed memory connected directly with, in close proximity to, or integrated as part of the processor 110. The system 100 can copy data from the memory 115 and/or the storage device 130 to the cache 112 for quick access by the processor 110. In this way, the cache can provide a performance boost that avoids processor 110 delays while waiting for data. These and other modules can control or be configured to control the processor 110 to perform various actions. Other system memory 115 may be available for use as well. The memory 115 can include multiple different types of memory with different performance characteristics. The processor 110 can include any general purpose processor and a hardware module or software module, such as module 1 132, module 2 134, and module 3 131 stored in storage device 130, configured to control the processor 110 as well as a special-purpose processor where software instructions are incorporated into the actual processor design. The processor 110 may essentially be a completely self-contained computing system, containing multiple cores or processors, a bus, memory controller, cache, etc. A multi-core processor may be symmetric or asymmetric.

To enable user interaction with the computing device 100, an input device 145 can represent any number of input mechanisms, such as a microphone for speech, a touch-sensitive screen for gesture or graphical input, keyboard, mouse, motion input, speech and so forth. An output device 135 can also be one or more of a number of output mechanisms known to those of skill in the art. In some instances, multimodal systems can enable a user to provide multiple types of input to communicate with the computing device 100. The communications interface 140 can generally govern and manage the user input and system output. There is no restriction on operating on any particular hardware arrangement and therefore the basic features here may easily be substituted for improved hardware or firmware arrangements as they are developed.

Storage device 130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 125, read only memory (ROM) 120, and hybrids thereof.

The storage device 130 can include software modules 132, 134, 131 for controlling the processor 110. Other hardware or software modules are contemplated. The storage device 130 can be connected to the system bus 105. In one aspect, a hardware module that performs a particular function can include the software component stored in a computer-readable medium in connection with the necessary hardware components, such as the processor 110, bus 105, display 135, and so forth, to carry out the function.

FIG. 1B illustrates a computer system 150 having a chipset architecture that can be used in executing the described method and generating and displaying a graphical user interface (GUI). Computer system 150 is an example of computer hardware, software, and firmware that can be used to implement the disclosed technology. System 150 can include a processor 155, representative of any number of physically and/or logically distinct resources capable of executing software, firmware, and hardware configured to perform identified computations. Processor 155 can communicate with a chipset 110 that can control input to and output from processor 155. In this example, chipset 110 outputs information to output 1105, such as a display, and can read and write information to storage device 170, which can include magnetic media, and solid state media, for example. Chipset 110 can also read data from and write data to RAM 175. A bridge 180 for interfacing with a variety of user interface components 185 can be provided for interfacing with chipset 110. Such user interface components 185 can include a keyboard, a microphone, touch detection and processing circuitry, a pointing device, such as a mouse, and so on. In general, inputs to system 150 can come from any of a variety of sources, machine generated and/or human generated.

Chipset 110 can also interface with one or more communication interfaces 190 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 155 analyzing data stored in storage 170 or 175. Further, the machine can receive inputs from a user via user interface components 185 and execute appropriate functions, such as browsing functions by interpreting these inputs using processor 155.

It can be appreciated that exemplary systems 100 and 150 can have more than one processor 110 or be part of a group or cluster of computing devices networked together to provide greater processing capability.

The present technology can be carried out in a network-based ecosystem in which computing devices can communicate with each other via one or more networks. Such computing devices can include, but are not limited to, personal computers, smartphone devices, tablet computers, server computers, network storage devices, network routing devices, set-top boxes, smartwatches, smart televisions, or any other type of network-connectable computing or smart device.

FIG. 2 illustrates an example network infrastructure 200 according to some embodiments. The network infrastructure 200 can include client devices C1, C2, . . . , Cn operatively coupled with a media distribution system 210, an application distribution system 220, or both via one or more networks 299. The client devices C1, C2, . . . Cn can include personal computer devices, smartphone devices, tablet devices, set-top box devices, smart television devices, netbook devices, smart watches, or any other types of computing or smart user devices. The one or more networks 299 can include a public network, such as the Internet, a private network, such as a local area network (LAN), or both.

The media distribution system 210 and/or application distribution system 220 can maintain user accounts for storing profile information, contact information, billing information, media items, taste or interest data, usage or content statistics, user preferences, past user behavior or statistics, location information, purchase statistics, demographics data, and/or any other user or targeting data. In some embodiments, the media distribution system 210 and the application distribution system 220 can allow users to create or modify their user accounts. Moreover, the user accounts can be unique user accounts created for respective users within the media distribution system 210 and/or application distribution system 220. In some embodiments, the media distribution system 210 can be an online store for selling or otherwise providing media content or items, such as iTunes available from Apple Inc. of Cupertino, Calif. Similarly, in some embodiments, the application distribution system 220 can be an online store for selling or otherwise providing software applications and items, such as the App Store available from Apple Inc. of Cupertino, Calif.

The media distribution system 210 and the application distribution system 220 can be also operatively coupled with third party partners T1, T2, . . . , Tn. The third party partners T1, T2, . . . , Tn can provide media content and software applications and services in addition to, or in connection with, the services provided by the media distribution system 210 and the application distribution system 220.

In some cases, the media distribution system 210 and/or application distribution system 220 can also maintain content consumption or delivery statistics, such as content consumed by, or delivered to, the client devices C1, C2, . . . , Cn. Such content can include, for example, media content, application content, web content, user content, device content, invitational content, etc. For example, the media distribution system 210 and application distribution system 220 can maintain a history of invitational content delivered to, or presented by the client devices C1, C2, . . . , Cn and/or content presented to, or accessed by, users at the client devices C1, C2, . . . , Cn. For example, the media distribution system 210 and the application distribution system 220 can store data indicating that the user at client device C1 viewed article X and web page Y, and received or viewed invitational content Z.

As further described below with respect to FIGS. 4 and 5, the media distribution system 210 and application distribution system 220 can maintain separate locations or logs for dividing different types of content. For example, any actual user identifiers such as user account identifiers, can be stored in a user account log or location that is maintained separate from other content and statistics data and withheld from other parties or devices. Moreover, invitational content received by, or presented at, the client devices C1, C2, . . . , Cn can be stored in a separate invitational content log or location which can maintain invitational content statistics. The information in the invitational content log or location can be associated with an anonymous identifier which is different than an actual identifier (e.g., user account identifier) and represents or identifies such invitational content and/or invitational content statistics. In some cases, the anonymous identifier can be generated and/or modified by the client devices C1, C2, . . . , Cn. Further, other content consumed by the client devices C1, C2, . . . , Cn, such as application content, web content, user content, device content, etc., can also be stored in yet another, separate content log or location which can maintain content consumption statistics. The information from the content log or location can be associated with another anonymous identifier which is different than the actual identifier (e.g., user account identifier) and the anonymous identifier associated with the invitational content log or location. This other anonymous identifier can represent or identify the content and/or content statistics associated with the content log or location. Also, in some cases, this anonymous identifier can be generated or modified by the client devices C1, C2, . . . , Cn.

To illustrate, in one example, the media distribution system 210 and/or the application distribution system 220 can maintain a user account identifier, which can be a unique identifier that represents a user and is stored along with personal and other user information in a user log, such as demographics data, behavioral data, location data, device statistics, preferences, a profile, purchase information, etc. The media distribution system 210 and/or the application distribution system 220 can separately maintain an invitational content log with invitational content statistics, such as which invitational content items have been delivered to a user, along with an invitational content identifier which identifies the invitational content and/or invitational content statistics. The media distribution system 210 and the application distribution system 220 can separately maintain a content log content statistics, such as which content items have been accessed or viewed by a user, along with a content identifier which identifies the content and/or content statistics. The user account identifier and other associated information can be maintain separate from the invitational content log and the content log so that the information in the invitational content log and the content log cannot be correlated with the specific user associated with the user account identifier.

The media distribution system 210 and/or the application distribution system 220 can also report statistics to one or more of the third party partners T1, T2, . . . , Tn. For example, the media distribution system 210 and/or application distribution system 220 can report invitational content statistics from the invitational content log. The media distribution system 210 and/or the application distribution system 220 can also include additional information associated with the user account identifier, such as demographics data, along with the reported invitational content statistics, while withholding the user account identifier and/or any other personal data which can specifically identify the user.

The media distribution system 210 and/or application distribution system 220 can use the anonymous, invitational content identifier to report the invitational content statistics and any other associated information, without including the user account identifier or any personal, identifying information that can correlate the invitational content statistics to a specific user.

The media distribution system 210 and/or application distribution system 220 can also report content statistics from the content log. The media distribution system 210 and/or the application distribution system 220 can also include additional information associated with the user account identifier, such as demographics data, along with the reported content statistics, while withholding the user account identifier and/or any other personal data which can specifically identify the user. The media distribution system 210 and/or application distribution system 220 can use the anonymous, content identifier to report the content statistics without including the user account identifier or any personal, identifying information that can correlate the content statistics to a specific user.

Such information and statistics can be reported to the third party partners T1, T2, . . . , Tn, invitational content server 250, or any other separate or remote entity, party, or device. Moreover, the information or statistics reported can be transmitted without the user account identifier or other personal data which can be used to identify specific users. Thus, the receiving parties can receive the information indicating what invitational content has been delivered to users and what content has been consumed by users without specifically identifying users or correlating any of the statistics to specific users.

The receiving parties (e.g., third party partners T1, T2, . . . , Tn, invitational content server 250, etc.) can use the various statistics received from the media distribution system 210 and/or application distribution system 220 to analyze invitational content delivery and content consumption statistics, optimize campaigns, maintain records, determine campaign effectiveness, and/or make any other considerations such as budgeting, targeting, cost, or content analysis.

In some cases, the media distribution system 210 and/or application distribution system 220 can report different information or statistics to different third party partners T1, T2, . . . , Tn. The third party partners T1, T2, . . . , Tn can represent different types of entities or parties, such as media, application, messaging, and digital content providers, and the content or statistics reported to each of the third party partners T1, T2, . . . , Tn can vary based on the specific third party partner identity or any pertinent agreement and/or requirements.

In addition, the client devices C1, C2, . . . , Cn can be operatively coupled with an invitational content server 250. The invitational content server 250 can be configured to target, package, and deliver invitational content to users. The invitational content server 250 can target invitational content to users based on several types of information. Such information can include, but is not limited to, behavioral information, geographic information, preferences, context information, and demographic information relating to the users associated with the client devices C1, C2, . . . , Cn, and so forth.

As described herein, one aspect of the present technology is to address improper gathering and use of data available from various sources. The present disclosure contemplates that, in some instances, this gathered data might include personal information data that uniquely identifies or can be used to contact or locate a specific person. Such personal information data can include demographic data, location-based data, telephone numbers, email addresses, twitter ID's, home addresses, or any other identifying information. In some cases, such information may be used to improve the delivery of invitational content including, promotions, advertisements, or any other content that may be of interest to users. However, the present disclosure contemplates that in some circumstances, such information may be used for more nefarious purposes, such as theft of identity or illicit tracking of particular individual's activities, location, or the like.

Of particular concern are non-trusted content providers, such as some of third party partners T1, T2, . . . , Tn or invitational content server 250 with which the user may not have a trusted relationship. In the case of trusted providers, such as media distribution system 210 and the application distribution system 220, gathering of such information may be less of a concern, as such providers typically have established procedures for preventing the abusive use of such personal information, as discussed below. Further, the sharing of such information with such providers may be necessary for the proper operation of the client devices C1, C2, . . . Cn.

The present disclosure recognizes that the use of such personal information data in the present technology can be used to the benefit of users. For example, the personal information data can be used to better understand user behavior, facilitate and measure the effectiveness of applications and delivered digital content. Accordingly, use of such personal information data enables calculated control of the delivered content. For example, the system can reduce the number of times a user receives a given ad or other content and can thereby select and deliver content that is more meaningful to users. Such changes in system behavior improve the user experience. Further, other uses for personal information data that benefit the user are also contemplated by the present disclosure.

The present disclosure further contemplates that the entities responsible for the collection, analysis, disclosure, transfer, storage, or other use of such personal information data should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after the informed consent of the users. Additionally, such entities would take any needed steps for safeguarding and securing access to such personal information data and ensuring that others with access to the personal information data adhere to their privacy and security policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of invitational content delivery services, the present technology can be configured to allow users to select to "opt in" or "opt out" of participation in the collection of personal information data during registration for services. In another example, users can select not to provide location information for invitational content delivery services. In yet another example, users can configure their devices or user terminals to prevent storage or use of cookies and other mechanisms from which personal information data can be discerned. The present disclosure also contemplates that other methods or technologies may exist for blocking access to their personal information data.

Moreover, the present disclosure includes mechanisms which can be implemented to protect the privacy of users and anonymize data collected. For example, data collected about a user can be maintained separately from any information, such as a user identifier or account identifier, that may identify the specific user. Any information collected or reported about the user which may be personal or may breach the user's privacy may be generalized or anonymized. For example, such data can be stored or reported without any information that may specifically identify the user, and the user can otherwise be anonymously identified using an anonymous or random identifier that may not reveal any specific details about the user.

Therefore, although the present disclosure may cover use of personal information data to implement one or more various disclosed embodiments, the present disclosure also contemplates that the various embodiments can also be implemented without the need for accessing and/or reporting such personal information data and/or with protections to maintain the user's privacy. The various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

As explained above, in some online ecosystems, a system operator could conceivably piece together the small amounts of personal data dispersed throughout a system to compile a relatively complete picture of who the user might be. Accordingly, some embodiments of the present technology involve managing the information shared with system partners by managing the use of unique identifier values to prevent system partners from collecting and piecing information to identify the user of a device or even to make an educated guess about the identity of the user.

FIG. 3 illustrates an example system 399 for device-based information management in an ecosystem having system partners 375 and 376 according to some embodiments of the present technology. As previously described with respect to FIG. 2, a client device 390 can be operatively coupled, through one or more networks, to the system partners 375 and 376. System partners 375 and 376 can include a number of different entities including online service providers, software applications, preinstalled device programs, media content distribution servers, application distribution servers, data monitoring agents, and other digital content providers or distributors.

The client device 390 can include a client device application 380, an identifier value creation and management module 385, and a request assembly module 365. The identifier value creation and management module 385 can be configured for generating unique identifier values for the client device 390 and managing interactions with the system partners 375 and 376. Additionally, the identifier value creation and management module 385 can be configured for monitoring requests for obtaining such unique identifier values. In some cases, the identifier creation and management module 385 can be configured to generate one or more anonymous and/or random identifiers which can be included within a request and/or reported to different parties (e.g., system partners) for identifying different types of data.

The request assembly module 365 can be configured to retrieve an appropriate identifier value from the identifier value creation and management module 385 to generate a request. In some cases, the request can be generated in response to a content request from client device application 380 for content from any of system partners 375 and 376. Moreover, in some cases, the request assembly module 365 can cause the request for content, including any generated identifier values, to be delivered to the appropriate system partner. In some embodiments, the request can include a user account identifier which identifies the user, client device 390, or an associated user account, as well as one or more additional identifiers. The one or more additional identifiers can be random or anonymous identifiers generated by the identifier value creation and management module 385. In some cases, the request can include a content identifier, which can be a random or anonymous identifier for identifying content accessed by, or presented at, client device 390, and/or an invitational content identifier, which can be a random or anonymous identifier for identifying invitational content received, accessed, or presented by client device 390.

As noted above, client device 390 can interact with system partners that are trusted (376) or non-trusted (375). Thus, the request assembly module 365 of client device 390 can be configured to define a trusted zone 370 indicating which identifier values to utilize with each of system partners 375 and 376. The determination of which a specific partner falls within trusted zone 370 (system partners 376) or outside trusted zone 370 (system partners 375) can be made by a user at the client device 390 on-demand or can be defined a priori at the client device 390. In such arrangements, a variable, on-demand, anonymous identifier value may be used for system partners 375 and the pre-defined identifier value associated with the client device 390 may be used for system partners 376. Alternatively, anonymous identifier values can be provided for at least some of the trusted system partners. In such cases, different controls can be provided at the client device 390 to separately adjust these anonymous identifier values. In configurations where the user at the client device 390 specifies that identifier values be adjusted periodically, the frequency of adjustments can be based on whether or not a system partner falls within the trusted zone. Additionally, the client device 390 can be configured for categorizing a system partner as trusted or non-trusted on demand. In such a configuration, the request assembly module 365 can be configured to monitor such a categorization and enforce the use of appropriate identifier values when requests for content are being forwarded to system partners.

The client device 390 can send different identifiers to system partners 375 and/or 376. In some cases, each of the different identifiers can be intended for use or receipt by a specific system partner. Moreover, in some cases, each of the different identifiers can be intended for use to identify different information or categories of information. For example, one identifier may be issued for identifying an interaction with, or presentation of, client device application 380, and another identifier may be issued for identifying an interaction with, or presentation of, invitational content. In some cases, a separate, protected identifier can be used to identify a user account and/or any personal user information.

This protected identifier can be kept separate from the other identifiers and any information maintained and associated with the other identifiers. In some cases, the protected identifier can be withheld from one or more system partners 375 and/or 376.

In some embodiments, the protected identifier can be maintained by a particular entity with permission to access the protected identifier, such as invitational content server 250, media distribution system 210 and/or application distribution system 220. Moreover, the anonymous identifiers generated by the client device 390 can be used to identify different content and/or interactions at the client device 390 without identifying the specific user. Thus, such information can be maintained and/or reported separately from the protected identifier to protect the privacy of the user.

In some embodiments, the request assembly module 365 (or at least similar request assembly logic) can be incorporated into a client device application 380. Moreover, in various types of applications, the time when identifier values and other information regarding the client device are generated or transmitted can vary. For example, some applications may have request assembly logic that is configured to retrieve any necessary identifier values any time a request for content is being assembled. In this case, the application will always have access to the newest identifier value available. Other applications may have request assembly logic that is configured to retrieve any necessary identifier values on a periodic or scheduled basis. In this case, the identifier value may be stale for a short while. Still other applications may have request assembly logic that is configured to retrieve any necessary identifier values upon startup of the application and this identifier value persists until the application is shut down and restarted. Thus, the stale identifier value would remain in use until the application is restarted. One method of handling stale identifier values is for the user to manually shut down applications either before or after the identifier value is altered. Thus, when the application is restarted, the current identifier value is utilized. However, the present disclosure also contemplates that the identifier value creation and management module 385 could include logic to automate this process. For example, upon obtaining a new identifier value, the identifier value creation and management module 385 could be configured to shut down and restart any currently running applications.

In some cases, an actual identifier value of client device 390 may be withheld from system partners 375 outside the trusted zone 370, and/or any of the system partners 376 within the trusted zone 370. However, the various embodiments are not limited in this regard. As noted above, it may not be necessary to withhold the identifier value for certain types of operations or categories of content. Thus, even system partners 375 outside the trusted zone 370 can receive an actual identifier value of the client device 390 under particular circumstances. In particular, certain types of operations or tasks may require an actual identifier value in order for such an operation to be performed, such as debugging, identity verification, sales of protected content, and other operations that require authentication of the client device or a consistent management of actions at the client device. Moreover, as previously explained, additional identifiers, which can be random or anonymous, can be shared with one or more of the system partners 375 and 376 for identifying or representing specific interactions at client device 390 or categories of content received and/or accessed by the client device 390.

Figure 4A:
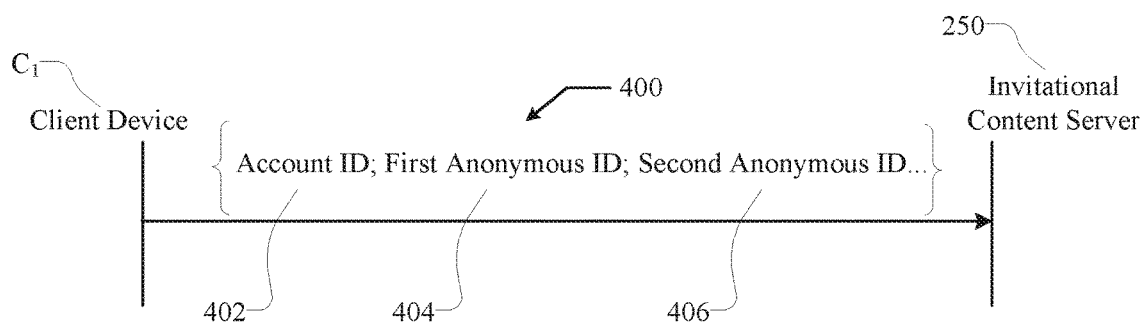
FIG. 4A illustrates an example request having multiple identifiers in accordance with an example embodiment.

FIG. 4A illustrates an example request 400 having multiple identifiers in accordance with an example embodiment. The request 400 can be transmitted by client device $C_1$ to invitational content server 250 to request content, such as invitational content and/or media content, from invitational content server 250. The request 400 can include identifiers 402-406 which can be used by invitational content server 250 to identify content and/or map a user or device to specific content. The identifiers 402-406 can include an account identifier 402 and anonymous identifiers 404-406. The account identifier 402 can be, for example, a user identifier, a device identifier, or a user account identifier. The account identifier 402 can be used to map a user to a user account and any related information, such as a user profile, user transactions, purchase history, user preferences, demographics, location information, personal data, etc.

The first anonymous identifier 404 can be used to map the same user to other content or a content store, such as a log of user information. The content mapped to the first anonymous identifier 404 can be maintained separately from the account identifier 402 and/or any personal data associated with the account identifier 402. For example, the first anonymous identifier 404 can be mapped to a content log associated with a user mapped to the account identifier 402. However, the content log can be maintained separately from the account identifier 402 and/or the content store or log associated with the account identifier 402. In some cases, the content log may not include any information linking the content log to the account identifier 402 that would allow the identity of the user associated with the account identifier 402 to be ascertained from the content log. In some embodiments, the first anonymous identifier 404 can be a content identifier which represents content presented by, and/or content interactions occurring at, the client device $C_1$.

The second anonymous identifier 406 can be used to map the user associated with the account identifier 402 to invitational content or an invitational content store, such as a log of invitational content and/or invitational content interactions associated with the client device $C_1$. The invitational content mapped to the second anonymous identifier 406 can be maintained separately from the account identifier 402 and/or any personal data associated with the account identifier 402. For example, the second anonymous identifier 406 can be mapped to an invitational content log associated with a user mapped to the account identifier 402. However, the invitational content log can be maintained separately from the account identifier 402 and/or the content store or log associated with the account identifier 402. In some cases, the invitational content log may not include any information linking the invitational content log to the account identifier 402 that may allow the identity of the user associated with the account identifier 402 to be ascertained from the invitational content log. In some embodiments, the second anonymous identifier 406 can be an invitational content identifier which represents invitational content presented by, and/or invitational content interactions occurring at, the client device $C_1$.

The first anonymous identifier 404 and second anonymous identifier 406 in the request 400 can provide multiple contexts for the account identifier 402. In other words, the first anonymous identifier 404 and second anonymous identifier 406 can represent multiple sets, categories, or collections of data which are associated with the account identifier 402 but anonymized so the account identifier 402 cannot be correlated or mapped to the first anonymous identifier 404, second anonymous identifier 406, or any of their associated data. However, in some embodiments, the request 400 can include more or less contexts. For example, the request 400 can include a device context for anonymously representing device information, a location context for anonymously representing location information, etc. Moreover, while the first anonymous identifier 404 and second anonymous identifier 406 can be anonymously related to, or associated with, the account identifier 402, in some embodiments, other anonymous identifiers can be included in the request 400 for representing one or more contexts or subsets of data anonymously related to, or associated with, a different type of identifier, such as a device identifier which identifies the client device $C_1$ or another account identifier which identifies a different user account.

While the request 400 is shown in FIG. 4 as including two anonymous identifiers, one of ordinary skill in the art will readily recognize that more or less anonymous identifiers may be included in the request 400 in other embodiments. Indeed, the anonymous identifiers in FIG. 4 are provided as a non-limiting example for explanation purposes. Moreover, while the request 400 is shown in FIG. 4 as being transmitted to the invitational content server 250, one of ordinary skill in the art will readily recognize that the request 400 can be transmitted to other servers or devices, such as third party providers or application distribution systems, in addition to or in lieu of the invitational content server 250.

Figure 4B:
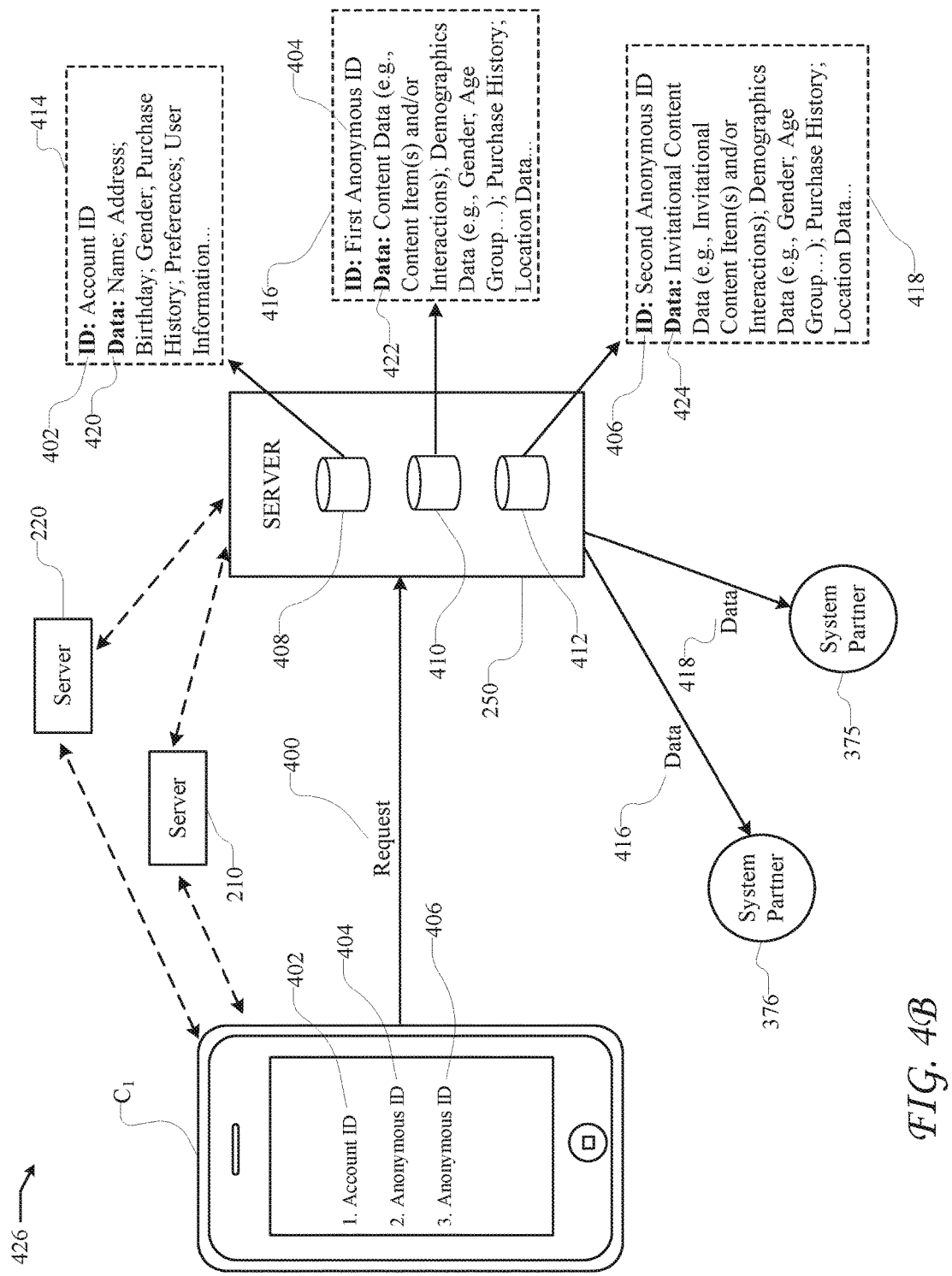
FIG. 4B illustrates a diagram of an example system for maintaining user anonymity in content statistics.

FIG. 4B illustrates a diagram of an example system 426 for maintaining user anonymity in content statistics. Client device $C_1$ can store identifier values 402-406. As previously explained, client device $C_1$ can generate any of the identifier values 402-406 and/or receive one or more of the identifier values 402-406 from a user or device, such as a server. For example, in some cases, the client device $C_1$ can create identifier values 404-406 by generating random and/or anonymous values (e.g., via identifier creation and management module 385), and generate identifier value 402 by creating an account with a server, such as media distribution system 210 or application distribution system 220.

The client device $C_1$ can use the identifier values 402-406 to generate request 400 (e.g., via request assembly module 365). The client device $C_1$ can then send the request 400 to the server 250. The server 250 can extract the identifier values 402-406 and store the identifier values 402-406 at locations 408-412. One or more of the locations 408-412 can be a storage location on the server 250. In some cases, one or more of the locations 408-412 can be on a separate or remote device, such as a remote storage device. Moreover, the locations 408-412 can be separate storage devices or containers, separate files, separate databases, separate logs, separate logical volumes, separate file systems, or any other separate physical or logical container.

The server 250 can store each identifier at a separate location from the locations 408-412. For example, the server 250 can store the user account identifier 402 at location 408, the first anonymous identifier at location 410, and the second anonymous identifier at location 412.

The server 250 can maintain content data 414-418 at the locations 408-412. The content data 414-418 at each of the locations 408-412 can include a respective identifier from the identifiers 402-406. For example, the content data 414 at location 408 can include the account identifier 402, the content data 416 at location 410 can include the first anonymous identifier 404, and the content data 418 at location 412 can include the second anonymous identifier 406. Further, the content data 414-418 stored at each of the locations 408-412 can include additional data 420-424, which can vary by type, category, amount, and so forth. In some cases, the data 420-424 in the content data 414-418 at each of the locations 408-412 can depend and/or relate to the specific identifier at the location. For example, the data 420 at location 408 can be associated with account identifier 402 and can include additional user information associated with the account identifier 402 and may include personal data. Data 422 at location 410 can be associated with the first anonymous identifier 404 and can include additional information associated with the identifier 404. Moreover, data 424 at location 412 can be associated with the second anonymous identifier 406 and can include additional information associated with the identifier 406.

The data 422 and 424 may include some of the data 420 or data inferred from the data 420. However, the account identifier 402 and any personal data that specifically identifies the user can be withheld from the data 422 and 424. For example, the data 422 can include content data, such as content items consumed at the client device $C_1$ (e.g., application content, web content, user content, etc.) and/or content interactions at the client device $C_1$. The data 422 can also include other data about the user that does not specifically identify the user, such as demographics data, purchase history information, location data, one or more time stamps, etc. The data 422 and anonymous identifier 404 in the content data 416 together can be used to determine that an unknown user with specific characteristics identified in the data 422 has consumed specific content or engaged in specific content interactions identified in the data 422, without specifically revealing the account identifier 402 or the user's identity. For example, the data 422 and anonymous identifier 404 can together be used to determine that unknown user A who is a male between the ages of 20 and 25 has viewed article X from application Y at the client device $C_1$. This information can then be maintained and/or reported for statistics, analytics, content optimization, content targeting, content performance evaluation, etc.

The data 424 in the content data 418 can include additional data associated with second anonymous identifier 406. For example, the data 424 can include invitational content data, such as invitational content items consumed or presented at the client device $C_1$ and/or invitational content interactions at the client device $C_1$. The data 424 can also include other data about the user that does not specifically identify the user, such as demographics data, purchase history information, location data, one or more timestamps, targeting data, invitational content activity and history, etc. The data 424 and anonymous identifier 406 in the content data 418 together can be used to determine that an unknown user with specific characteristics identified in the data 424 has consumed specific invitational content or engaged in specific invitational content interactions identified in the data 424, without specifically revealing the account identifier 402 or the user's identity. For example, the data 424 and anonymous identifier 406 can together be used to determine that unknown user A who is a male between the ages of 20 and 25 has viewed article X from application Y at the client device $C_1$. This information can then be maintained and/or reported for statistics, analytics, campaign optimization, invitational content targeting, invitational content performance evaluation, managing invitational content and/or invitational content campaigns, etc.

In some embodiments, the server 250 can also use the content data 416 and/or 418 to target content or invitational content to the user associated with the account identifier 402. Moreover, in some embodiments, the server 250 can maintain timestamps in the content data 414, 416 and/or 418 describing specific events, such as a content presentation or interaction. For example, the server 250 can include timestamps in the locations 408, 410, and/or 412 which can correspond to one or more events or interactions recorded within the content data 414, 416, and/or 418. In some cases, one or more timestamps can be degraded. For example, in some embodiments, timestamps in the location 408 relating to, or associated with, the account identifier 402 can be maintained according to the actual timestamps recorded, while the timestamps in location 408 relating to, or associated with, anonymous identifiers 404-406 can be degraded to provide a coarse-grained resolution of the timing information. The timestamps can be degraded by filtering or masking time information in the timestamps. For example, a timestamp can be degraded to include a day or week of an event without the actual time of day (e.g., 5-5-15 as opposed to 5-5-15/2:05 A.M.). In some embodiments, the server 250 can maintain timestamps in location 408 for events associated with account identifier 402, but may not maintain timestamps in locations 410 or 412 for events associated with anonymous identifiers 404 and/or 406.

In some embodiments, the server 250 can send the data 416 and 418 to one or more partners 375 and 376. The server 250 can send all or specific portions of the data 416 and 418 to the partners 375 and 376. However, the server 250 can withhold the account identifier 402 and any personal data in content data 414 that would enable partners 375 and 376 to identify the specific user associated with the account identifier 402. In some embodiments, the server 250 can send any portions of the content data 416 to system partner 375 without including any data from locations 408 or 412 (i.e., content data 414 and 418) that is not also contained in the data content 416. Similarly, the server 250 can send any portions of the content data 418 to system partner 376 without including any data from locations 408 or 410 (i.e., content data 414 and 416) that is not also contained in the data content 418. In other embodiments, the server 250 can send any portions of the data from the content data 416 and 418 to the same system partner, such as system partner 375 or 376.

The system partners 375 and 376 can receive the content data 416 and 418 and collect data and statistics associated with the unknown user represented by anonymous identifiers 404 and 406. The system partners 375 and 376 may not receive the account identifier 402 or private, personal data from location 408 that could reveal the actual identity of the specific user associated with the account identifier 402, and thus may not be able to identify the specific user associated with the anonymous identifiers 404 and 406 and the content data 416 and 418. The system partners 375 and 376 can use the collected data, including the content data 416 and 418, to target content and invitational content to the unknown user, perform analytics and collect statistics, adjust content and invitational content campaigns, compute and/or report metrics, etc. By maintaining the account identifier 402 and personal data from location 408 separate from the content data 416 and 418 transmitted to the system partners 375 and 376, the server 250 can report data and statistics about users without revealing the users' identities, and the system partners 375 and 376 can obtain useful user data and statistics, without personal or private data about the user, to perform calculations, analytics, and examinations for specific interactions and unknown users having specific characteristics.

In some embodiments, the server 250 and/or client device $C_1$ can also communicate with servers 210 and/or 220. For example, in some embodiments, the client device $C_1$ can communicate with the media distribution system 210 to authenticate a personal user account. The media distribution system 210 can thus maintain a personal user account associated with the client device $C_1$. The personal user account can include a personal user account identifier, maintained at the media distribution system 210, which can be used by the client device $C_1$ and media distribution system 210 to identify and authenticate a specific user. Accordingly, the personal user identifier maintained by the media distribution system 210 may specifically identify the user associated with the client device $C_1$. Moreover, the personal user account identifier may also be associated with user information for the user associated with the client device $C_1$, such as payment information, purchase history information, and other user data.

The personal user account maintained by the media distribution system 210 can be associated with the account identifier 402 received by the server 250 in the request 400 in the sense that the personal user account and the account identifier 402 both correspond to the same user. Thus, the account identifier 402 can anonymously represent the personal user account identifier at the media distribution system 210. Moreover, since the personal user account maintained by the media distribution system 210 may be associated with private or personal user information, the media distribution system 210 can withhold the personal user account identifier and any private or personal user data from the server 250 and/or any other servers. However, in some embodiments, the server 250 can communicate with the media distribution system 210 to obtain non-private or non-personal data for account identifier 402 from the media distribution system 210. Such data can include non-private or non-personal data (i.e., data which cannot reveal the actual identity of the specific user associated with the personal user account) associated with the personal user account at the media distribution system 210 which the server 250 can store at location 408 (e.g., as part of data 420) and associate with the account identifier 402. This way, the server 250 can obtain relevant and useful information for the account identifier 402, without receiving any private or personal data of the user associated with the account identifier 402. In other words, the server 250 can obtain information about the user associated with account identifier 402, based on data received from the media distribution system 210 and corresponding to the personal user account, while masking the user's true identity.

For example, since the media distribution system 210 may store data associated with the personal user account identifier, which therefore also corresponds to the account identifier 402, the server 250 can communicate with the media distribution system 210 to obtain data, such as demographics or purchase history details, for account identifier 402 from the media distribution system 210. However, to protect the personal user account identifier, and some of the associated data, the media distribution system 210 can ensure that the data transmitted to the server 250 does not include the personal user account identifier and/or any private data that may identify the specific user associated with the personal user account identifier (as well as the account identifier 402). This way, the media distribution system 210 can safeguard the personal user account identifier and any private/personal data associated with the personal user account identifier from the server 250, while at the same time allowing the server 250 to obtain some useful data, such as demographics, about the account identifier 402.

As previously explained, the server 250 can then use the anonymous identifiers 404 and 406 to provide data associated with the account identifier 402 to system partners 375 and 376, as well as any other party or server, without revealing the account identifier 402 or any other data that may specifically identify the user associated with the account identifier 402 and personal user account maintained by the media distribution system 210. Moreover, since the server 250 may not receive the personal user account identifier from the media distribution system 210, the server 250 may not know the real identity of the user associated with the account identifier 402. Consequently, the server 250 may not reveal the personal user account identifier to other parties or servers (e.g., system partners 375 and 376) or any other data that may specifically identify the user associated with the account identifier 402 and personal user account maintained by the media distribution system 210. Accordingly, the server 250 and system partners 210 and 220 can collect user information to generate metrics or statistics, target content to the user, and/or modify content and/or content campaigns, for example, without maintaining or even known the real identity of the user associated with the account identifier 402 and personal user account identifier.

Having disclosed some basic system components and concepts, the disclosure now turns to the example method embodiment shown in FIG. 5. For the sake of clarity, the method is described in terms of invitational content server 250, as shown in FIG. 2, configured to practice the method. The steps outlined herein are exemplary and can be implemented in any combination thereof, including combinations that exclude, add, or modify certain steps.

At step 500, the invitational content server 250 can first receive a media content request from a client device (e.g., client device $C_1$), the media content request including a user account identifier (e.g., account identifier 402) and at least one anonymous identifier (e.g., anonymous identifiers 404 and/or 406). The at least one anonymous identifier can be, for example, a random identifier or a user selected identifier which anonymously represents or identifies the client device and/or the user associated with the client device. In some cases, the at least one anonymous identifier can be generated by the client device, created by a user, randomly selected by a user or device from a list of identifiers, and/or generated by a server.

Moreover, the at least one anonymous identifier can include multiple anonymous identifiers that are different from the user account identifier. For example, in some cases, the at least one anonymous identifier can include a first anonymous identifier and a second anonymous identifier. The first and second anonymous identifiers can be different and separate from the user account identifier. The first and second anonymous identifiers can also be different and separate from a device identifier associated with the client device. In some cases, the first anonymous identifier can be a content identifier, which can identify content presented at the client device and/or content interactions at the client device, such as application content and/or application content interactions, Internet content (e.g., a web page) and/or interactions, user content, and so forth. The first anonymous identifier can anonymously associate the user and/or client device to the content and/or content interactions. Thus, the first anonymous identifier can reveal that a user represented by the first anonymous identifier, whose true identity is not provided by the first anonymous identifier, is associated with one or more content interactions that occurred at the client device and/or one or more specific content items that were presented at the client device. In other words, the first anonymous identifier can indicate that some unknown user consumed content XYZ at the client device.

On the other hand, the second anonymous identifier can be an invitational content identifier, which can identify invitational content delivered to or presented by, and/or invitational content interactions at, the client device. The second anonymous identifier can anonymously associate the user and/or client device to the invitational content and/or invitational content interactions. Thus, the second anonymous identifier can reveal that a user represented by the second anonymous identifier, whose true identity is not provided by the second anonymous identifier, is associated with one or more invitational content interactions that occurred at the client device and/or one or more specific invitational content items that were presented at the client device. In other words, the second anonymous identifier can indicate that some unknown user consumed invitational content XYZ at the client device.

As indicated above, the at least one anonymous identifier can associate a user with specific content and/or content interactions. Moreover, the anonymous identifier does not reveal the specific identity of the user. Thus, the anonymous identifier can reveal that some unknown user whose true identity is not revealed by the anonymous identifier consumed and/or interacted with certain content items.

At step 502, the invitational content server 250 can store the user account identifier and the at least one anonymous identifier in separate locations and without attributing the at least one anonymous identifier to a user account associated with the user account identifier. For example, since the user account identifier may reveal or identify the true identity of the user, the invitational content server 250 can maintain the user account identifier separately from the anonymous identifier, and without any associations between the user account identifier and the anonymous identifier to prevent the anonymous identifier from being correlated to the user account, and thus protect the user's true identity. This way, neither the user account identifier nor the anonymous identifier can be used to map or associate the content and/or content interactions represented by the anonymous identifier with the specific user associated with the user account identifier.

In some embodiments, the invitational content server 250 can store the user account identifier and the at least one anonymous identifier in separate logs, databases, storage devices, servers, and/or files. For example, the invitational content server 250 can store the user account identifier in a user account log or profile, and the anonymous identifier in a separate content log or profile. The invitational content server 250 can also maintain other information in each of the locations where the user account identifier and the anonymous identifier are stored. For example, in the previous example where the user account identifier is stored in a user log, the user log can contain user information and data, such as demographics data, purchase history data, location data, personal data, activity data, preferences, and so forth. Similarly, in the same example where the anonymous identifier is stored in a content log, the content log can contain content and/or user information, such as content interactions or activity, content consumed by the user, content preferences, demographics data, and so forth. In some embodiments, to protect the privacy of the user, however, the user account identifier and any information which can personally and specifically identify the user associated with the user account identifier are kept separate from the content log and thus may not be contained in the content log or otherwise referenced in the content log.

At step 504, the invitational content server 250 can transmit a media content item to the client device based on the user account identifier. For example, the invitational content server 250 can select one or more media content items based on the user account identifier or any data associated with the user account identifier, and transmit the one or more media content items. In some embodiments, the invitational content server 250 can use data associated with the account identifier, such as data stored in a log or profile of the user account identifier, to target the media content item to the user or client device. For example, the invitational content server 250 can use demographics data, user preferences, purchase history data, user activity, or other user information associated with the user account identifier to target the media content item to the user or client device. The media content item can include one or more invitational content items, such as coupons or promotional items, and/or one or more media items, such as video, audio, text, or any combination thereof.

At step 506, the invitational content server 250 can report the at least one anonymous identifier to a remote device without the user account identifier. For example, the invitational content server 250 can transmit the anonymous identifier to one or more remote parties or servers, such as a system partner, an application distribution system, a content distribution system, a provider, a distributor, a statistics server, an analytics server, a digital content provider, a data monitoring agent, and so forth.

In some cases, when transmitting or reporting the anonymous identifier, the invitational content server 250 can also transmit or report data or content associated with the anonymous identifier. For example, the invitational content server 250 can transmit or report data identifying specific content interactions at the client device or content consumed by, or presented at, the client device. Thus, the invitational content server 250 can transmit to a remote server data associating a specific content item and/or content interaction with the anonymous identifier. Such data can indicate that the specific content item was consumed by an unknown user represented by the anonymous identifier and/or the unknown user was involved in the specific content interaction. The invitational content server 250 can also transmit or report additional data about the user, which can be obtained by the invitational content server 250 based on the user account identifier for example, such as demographics data, location information, or statistics. However, the invitational content server 250 can withhold the user account identifier or any data that may specifically reveal the identity of the user associated with the user account identifier. This way, the remote server that receives the data from the invitational content server 250 will be able to determine that an unknown user identified by the anonymous identifier having specific characteristics identified by the data received from the invitational content server 250 has consumed specific content and/or performed specific content interactions. Yet the remote server that receives the data from the invitational content server 250 may not be able to ascertain the actual or true identity of the user based on the anonymous identifier or the other data received from the invitational content server 250.

For example, the invitational content server 250 can transmit an anonymous identifier to a remote server and information indicating that an unknown user represented by the anonymous identifier has viewed article X from application Y. The invitational content server 250 can also transmit other information about the user which does not identify the user's specific identity. For example, the invitational content server 250 can also transmit information indicating that the unknown user is a male between the ages of 20 and 25 and that the current location of the unknown user is location Z. This way, the remote server can determine that an unknown male user between the ages of 20 and 25 has viewed article X from location Y and at location Z. The remote server will be able to aggregate this data with other statistics to determine patterns or other details. For example, the remote server may be able to determine that 20 males ages 20-25 have viewed article X from application Y and 50 females ages 20-25 have viewed the article X from application Y.

In some embodiments, the invitational content server 250 can also report or transmit other anonymous identifiers. The other anonymous identifiers can represent the same user but may be associated with other content and/or content interactions. For example, the invitational content server 250 may report or transmit an anonymous invitational content identifier which associates the user with specific invitational content and/or invitational content interactions. The invitational content server 250 can also include other user information as previously described with respect to the anonymous identifier. For example, the invitational content server 250 can include demographics data and/or location information. This way, the remote server can determine that the unknown user represented by the anonymous invitational content identifier has consumed invitational content item A from application B at the client device. Based on the additional information about the user, the remote server may also be able to determine that the unknown user represented by the anonymous invitational content identifier is a male between the ages of 20 and 25. This way, the remote server may be able to determine that invitational content item A has been delivered to the unknown male user between ages 20 and 25. The remote server can thus maintain statistics and performance information for specific invitational content and match the statistics and performance with specific unknown users and user characteristics, without necessarily identifying the specific user or otherwise mapping such information to a specific user identity.

In some embodiments, the invitational content server 250 can report or transmit multiple, different anonymous identifiers and associated data to the same remote server or party. However, in some embodiments, the invitational content server 250 can report or transmit the multiple, different anonymous identifiers and associated data to one or more different remote servers or parties. For example, the invitational content server 250 can report or transmit an anonymous invitational content identifier and associated data to a remote server collecting invitational content statistics, and an anonymous application content identifier and associated data to a different remote server collecting application content statistics.

In some embodiments, the invitational content server 250 can report the anonymous identifier in response to a request, event, action, schedule, or any other triggering condition. Moreover, in some embodiments, the invitational content server 250 can transmit the media content item in response to the media content request and/or any other event, schedule, or condition.

While the method in FIG. 5 is described with respect to an invitational content server 250 configured to practice the various steps, one of ordinary skill in the art will readily recognize that the method and/or any steps in the method can be performed by another device(s), such as a media distribution system 210, an application distribution system 220, a third partner $T_1$, a statistics server, or any other server or device. The invitational content server 250 is described in FIG. 5 as a non-limiting example for explanation purposes.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Claim language reciting "at least one of" a set indicates that one member of the set or multiple members of the set satisfy the claim. Tangible computer-readable storage media, computer-readable storage devices, or computer-readable memory devices, expressly exclude media such as transitory waves, energy, carrier signals, electromagnetic waves, and signals per se.

What is claimed is:

1. A computer-implemented method comprising:
   receiving, by a server from a client device, a media content request comprising a user account identifier, a content identifier, and a targeted media content identifier, the content identifier being different and separate from the user account identifier, the target media content identifier, and a device identifier associated with the client device, wherein the content identifier identifies content presented at the client device;
   storing, by the server, the user account identifier in a user account log maintained at a first storage device;
   storing, by the server, the content identifier in a user content log maintained at a second storage device, wherein the content identifier is stored in the user content log without information attributing the content identifier to a user account associated with the user account identifier;
   storing the targeted media content identifier in a targeted content log maintained at a third storage location that is separate from the user account identifier and the content identifier, the targeted media content identifier being stored in the targeted content log without association with the user account identifier; and
   in response to the media content request, transmitting a media content item to the client device based on the user account identifier;
   reporting the content presented at the client device associated with the content identifier, the content being reported along with the content identifier and without the user account identifier; and
   reporting a delivery of the media content item to the client device, wherein the delivery is reported with the targeted media content identifier, the targeted media content identifier identifying the delivery of the media content item to the client device.

2. The method of claim 1, wherein reporting the delivery comprises transmitting the targeted media content identifier, an indication of the media content item transmitted to the client device, and demographic data associated with the user account identifier.

3. The method of claim 1, wherein at least one of the content identifier and the targeted media content identifier comprises location information associated with the client device.

4. The method of claim 1, wherein reporting the content presented at the client device comprises transmitting the content identifier and demographic data associated with the user account identifier.

5. The method of claim 4, wherein reporting the content presented at the client device further comprises transmitting an indication of the content presented at the client device.

6. The method of claim 1, wherein the user account log comprises data associated with the user account identifier, the data comprising at least one of user demographics data, a user profile, and prior transaction information associated with the user account.

7. The method of claim 1, wherein the content log comprises data associated with the content identifier, the data comprising at least one of user demographics data and location information associated with the client device.

8. The method of claim 1, wherein the content presented at the client device comprises at least one of application content and a web page, and wherein reporting the content comprises identifying the at least one of the application content and the web page.

9. The method of claim 1, wherein the media content item comprises targeted media content selected based on data associated with the user account identifier, the data comprising at least one of demographics data, location information, and targeting data.

10. The method of claim 1, wherein the user account log and the content log store data associated with the user account, and wherein the content identifier comprises an anonymous identifier generated by the client device.

11. A system comprising:
a processor; and
a computer-readable storage medium having stored therein instructions which, when executed by the processor, cause the processor to perform operations comprising:
receiving, from a client device, a media content request comprising a user account identifier, a content identifier, and a targeted media content identifier, the content identifier being different and separate from the user account identifier, the targeted media content identifier, and a device identifier associated with the client device, wherein the content identifier identifies content presented at the client device;
storing the user account identifier in a user account log maintained at a first storage device;
storing the content identifier in a user content log maintained at a second storage device, wherein the content identifier is stored in the user content log without information attributing the content identifier to a user account associated with the user account identifier;
storing the targeted media content identifier in a targeted content log maintained at a third storage location that is separate from the user account identifier and the content identifier, the targeted media content identifier being stored in the targeted content log without association with the user account identifier;
in response to the media content request, transmitting a media content item to the client device based on the user account identifier;
reporting the content presented at the client device associated with the content identifier, the content being reported along with the content identifier and without the user account identifier; and
reporting a delivery of the media content item to the client device, wherein the delivery is reported with the targeted media content identifier, the targeted media content identifier identifying the delivery of the media content item to the client device.

12. The system of claim 11, wherein reporting the delivery comprises transmitting the targeted media content identifier, an indication of the media content item transmitted to the client device, and demographic data associated with the user account identifier, and wherein the targeted media content identifier comprises an anonymous identifier generated by the client device.

13. The system of claim 11, wherein reporting the content presented at the client device comprises transmitting the content identifier, demographic data associated with the user account identifier, and an indication of the content presented at the client device.

14. The system of claim 11, wherein the user account log comprises a first set of data associated with the user account identifier, the first set of data comprising at least one of user demographics data, a user profile, and prior transaction information associated with the user account, and wherein the content log comprises a second set of data associated with the user account identifier, the second set of data comprising at least one of user demographics data and location information associated with the client device.

15. A non-transitory computer-readable storage medium having stored therein instructions which, when executed by a processor, cause the processor to perform operations comprising:
receiving, by a server from a client device, a media content request comprising a user account identifier, a content identifier, and a target media content identifier, the content identifier being different and separate from the user account identifier, the target media content identifier, and a device identifier associated with the client device, wherein the content identifier identifies content presented at the client device;
storing, by the server, the user account identifier in a user account log maintained at a first storage device;
storing, by the server, the content identifier in a user content log maintained at a second storage device, wherein the content identifier is stored in the user content log without information attributing the content identifier to a user account associated with the user account identifier;
storing, by the server, the targeted media content identifier in a targeted content log maintained at a third storage location that is separate from the user account identifier and the content identifier, the targeted media content identifier being stored in the targeted content log without association with the user account identifier;
in response to the media content request, transmitting a media content item to the client device based on the user account identifier;
reporting the content presented at the client device associated with the content identifier, the content being reported along with the content identifier and without the user account identifier;
reporting a delivery of the media content item to the client device, wherein the delivery is reported with the targeted media content identifier, the targeted media content identifier identifying the delivery of the media content item to the client device.

16. The non-transitory computer-readable storage medium of claim 15, further comprising reporting at least one of demographic data associated with the user account identifier and location information associated with the client device.

17. The non-transitory computer-readable storage medium of claim 15, wherein the content identifier is an anonymous identifier, wherein the user account log comprises data associated with the user account identifier, the data comprising at least one of user demographics data, a user profile, and prior transaction information associated with the user account.

18. The non-transitory computer-readable storage medium of claim 15, wherein the content presented at the client device comprises at least one of application content and a web page, and wherein the reporting the content identifies the at least one of the application content and the web page, and wherein the media content item comprises invitational content selected based on data associated with the user account identifier and the content identifier, the data comprising at least one of demographics data, location information, and targeting data.

* * * * *